United States Patent
Hirsch et al.

(10) Patent No.: US 11,599,613 B2
(45) Date of Patent: Mar. 7, 2023

(54) METHOD FOR CONTROLLING A SECURITY SYSTEM OF A CHARGING STATION FOR CHARGING ELECTRIC VEHICLES

(71) Applicant: Volkswagen Aktiengesellschaft, Wolfsburg (DE)

(72) Inventors: Michael Hirsch, Peine (DE); Holger Rendel, Braunschweig (DE); Erik Schondorff, Magdeburg (DE); Matthias Meitzner, Wendeburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 307 days.

(21) Appl. No.: 16/882,162

(22) Filed: May 22, 2020

(65) Prior Publication Data
US 2020/0372143 A1 Nov. 26, 2020

(30) Foreign Application Priority Data
May 23, 2019 (DE) .................. 10 2019 207 566.5

(51) Int. Cl.
G06F 21/32 (2013.01)
B60L 53/60 (2019.01)
B60L 53/16 (2019.01)

(52) U.S. Cl.
CPC .............. *G06F 21/32* (2013.01); *B60L 53/16* (2019.02); *B60L 53/60* (2019.02)

(58) Field of Classification Search
None
See application file for complete search history.

(56) References Cited

U.S. PATENT DOCUMENTS

| 10,059,224 B2 | 8/2018 | Mauter |
| 2008/0122577 A1 | 5/2008 | Gutta et al. .................. 340/5.52 |

(Continued)

FOREIGN PATENT DOCUMENTS

| CN | 206186816 U | 5/2017 | .............. B60L 11/18 |
| DE | 102010032580 A1 | 11/2011 | ............... G08C 7/02 |

(Continued)

OTHER PUBLICATIONS

Manasa, N.L. et al., "Chapter 12: Fusion of Multiple Biometric Traits: Fingerprint, Palmprint and Iris," Bio Inspiring Cyber Security and Cloud Services: Trends and Innovations, Springer, pp. 287-320, 2014.

(Continued)

*Primary Examiner* — Brandon Hoffman
(74) *Attorney, Agent, or Firm* — Slayden Grubert Beard PLLC

(57) ABSTRACT

The invention relates to a method for controlling a security system of a charging station for charging electric vehicles, the security system comprising the following elements: a charging plug, the charging plug comprising a sensor unit for recording biometric data of a user that are used for authenticating the user on the security system, and a control unit for evaluating biometric data of the user. For this purpose, according to the invention, the control unit extracts a plurality of features from the biometric data of the user, and the control unit evaluates the features of the biometric data in a plurality of stages.

20 Claims, 5 Drawing Sheets

(56) References Cited

U.S. PATENT DOCUMENTS

| | | | |
|---|---|---|---|
| 2012/0217928 A1 | 8/2012 | Kulidjian et al. | 320/109 |
| 2013/0329967 A1* | 12/2013 | Abiko | G06V 40/12 |
| | | | 382/115 |
| 2016/0104486 A1 | 4/2016 | Penilla et al. | 704/232 |
| 2017/0046508 A1 | 2/2017 | Shin et al. | 726/18 |
| 2017/0080861 A1* | 3/2017 | Vora | B60R 1/00 |
| 2017/0112671 A1 | 4/2017 | Goldstein | 128/867 |
| 2018/0063709 A1* | 3/2018 | Morrison | H04L 9/0861 |
| 2018/0215280 A1 | 8/2018 | Lee et al. | |
| 2019/0066416 A1* | 2/2019 | Dhillon | B60L 53/16 |
| 2019/0248439 A1 | 8/2019 | Wang et al. | |

FOREIGN PATENT DOCUMENTS

| | | | |
|---|---|---|---|
| DE | 102010038568 A1 | 2/2012 | B60L 11/18 |
| DE | 102011107900 A1 | 8/2012 | B60L 11/18 |
| DE | 102013010283 A1 | 12/2014 | B60L 11/18 |
| DE | 102016207341 A1 | 11/2017 | B60S 5/00 |
| EP | 2352208 | 8/2011 | H01R 13/639 |
| EP | 2436566 B1 | 4/2012 | B60R 25/00 |
| EP | 3472033 A1 | 4/2019 | B62H 5/00 |

OTHER PUBLICATIONS

German Office Action, Application No. 102019207566.5, 8 pages, dated Jan. 15, 2020.
"Biometrics," Wikipedia, URL: https://en.wikipedia.org/w/index.php?title=Biometrics&oldid=897882113, 16 pages, Retrieved on Jan. 15, 2020.
Chinese Office Action, Application No. 202010440329.5, 11 pages, dated Nov. 1, 2022.

* cited by examiner

METHOD FOR CONTROLLING A SECURITY SYSTEM OF A CHARGING STATION FOR CHARGING ELECTRIC VEHICLES

CROSS-REFERENCE TO RELATED APPLICATIONS

This application claims priority to German Patent Application No. DE 10 2019 207 566.5, filed on May 23, 2019 with the German Patent and Trademark Office. The contents of the aforesaid Patent Application are incorporated herein for all purposes.

TECHNICAL FIELD

The invention relates to a method for controlling a security system of a charging station for charging electric vehicles according to the independent method claim. The invention further relates to a corresponding security system for a charging station for charging electric vehicles.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In modern charging stations for charging electric vehicles, in most cases a separate authentication step is provided which is implemented, for example, at the charging station itself or via a smartphone app. During the authentication step, biometric data, inter alia, are recorded which can be used to authenticate an authorized user. An example of a method for controlling a security system of a charging station is known from the document DE 10 2010 032 580 A1. A separate authentication step can be perceived as such by the user. In the presence of a separate authentication step of this kind, intuitive and fluid operation of the charging station is rendered difficult.

SUMMARY

An object of the invention is therefore to provide an improved method for controlling a security system of a charging station for charging electric vehicles which overcomes the above-mentioned disadvantages at least in part.

The object is solved by a method for controlling a security system of a charging station for charging electric vehicles having the features of the independent method claim. Embodiments of the invention are discussed in the dependent claims and the following description.

In one exemplary aspect, a method for controlling a security system of a charging station for charging electric vehicles is provided. The security system comprises:
 a charging plug, wherein the charging plug comprising a sensor unit for recording biometric data of a user that are used for authenticating the user on the security system; and
 a control unit for evaluating biometric data of the user; wherein
 the control unit extracts a plurality of features from the biometric data of the user; and the control unit evaluates the features of the biometric data in a plurality of stages.

The details of one or more embodiments are set forth in the accompanying drawings and the description below. Other features will be apparent from the description, drawings, and from the claims.

DETAILED DESCRIPTION

Figure 1:
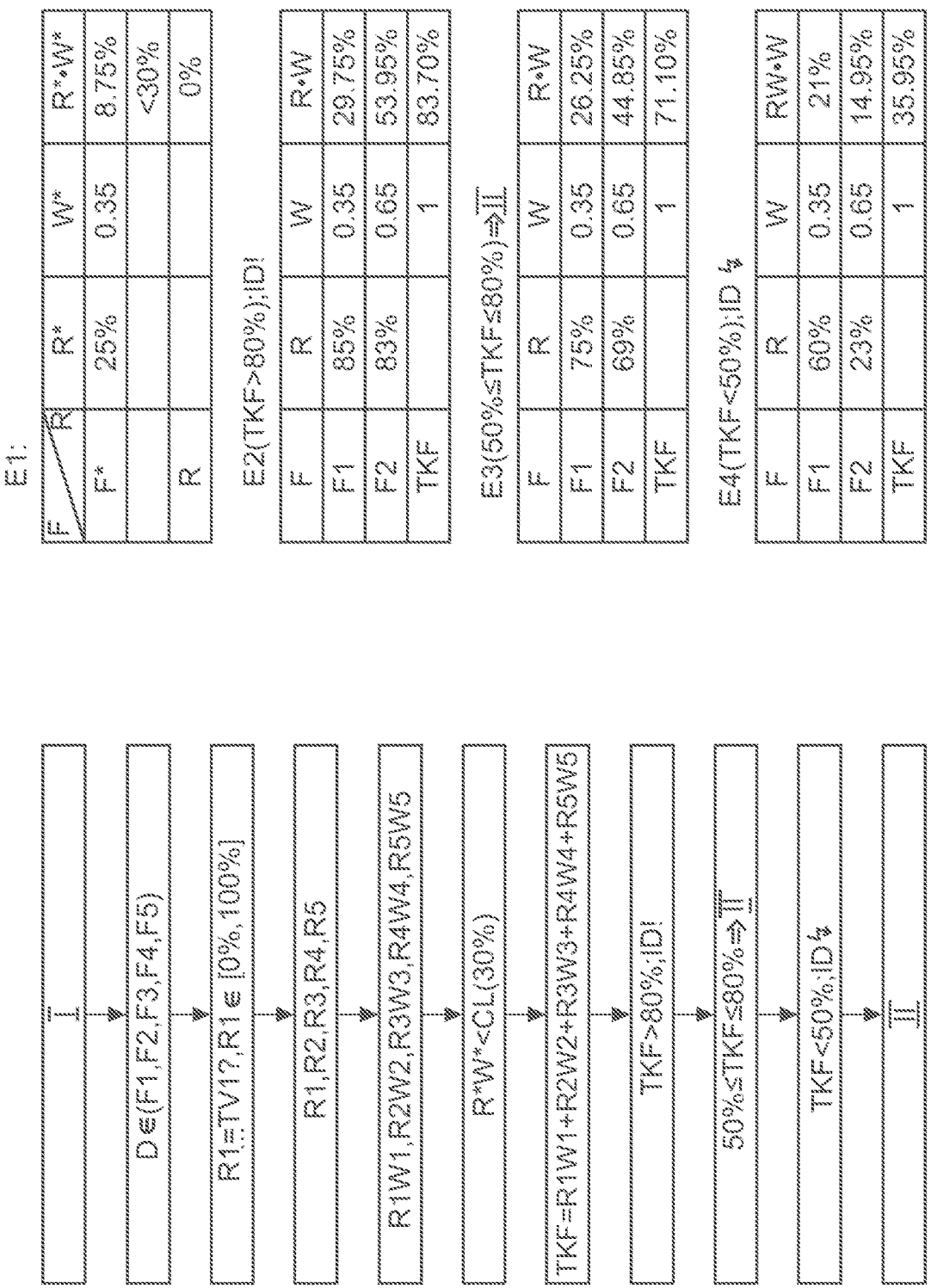
FIG. 1 shows a schematic representation of a method with evaluation examples in a first stage.

Specific embodiments of the invention are described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, the invention provides a method which allows for intuitive and fluid operation of the charging station, which can be implemented quickly and in an imperceptible manner, and which allows for greater convenience of operation of the charging station. Where possible and in some embodiments, a user does not notice any separate authentication step and should not carry with them any contactless and/or contact-based identification objects. The method within the context of the present teaching may in some embodiments proceed as securely as possible, without the danger of a security code being intercepted and/or copied. In some embodiments, the method only requires a security system infrastructure that is as simple as possible. In some embodiments, a corresponding security system for a charging station for charging electric vehicles is provided.

It is noted that features that are disclosed herein in relation to the individual aspects and/or embodiments can be combined with one another in an interchangeable manner, such as in embodiments that differ from the discussed embodiments. Specific references to detailed embodiments, features, components, process steps, and other elements are not intended to be limiting.

A first exemplary aspect provides a method for controlling a security system of a charging station for charging electric vehicles, the security system comprising the following elements: a charging plug, the charging plug comprising a sensor unit for recording biometric data of a user that are used for authenticating the user on the security system, and a control unit for evaluating biometric data of the user. For this purpose, the control unit extracts a plurality of features from the biometric data of the user, and the control unit evaluates the features of the biometric data in a plurality of stages.

Within the scope of the present aspect, the sensor unit for recording biometric data of a user may comprise optical, capacitive and/or acoustic sensor elements, for example in the form of fingerprint scanners.

In some embodiments, it is conceivable for the sensor unit for recording biometric data of a user to comprise a plurality of isolated and/or extensive and/or strip-shaped sensor elements in order to extract in particular complex features of the biometric data and to be able to discern even complex movement sequences, gestures and/or gripping patterns therefrom.

Within the context of the present aspect, "extract" means that the control unit detects certain characteristic features in the biometric data from the plethora of data recorded that can make possible quick, secure and reliable authentication of the user.

The features of the biometric data within the scope of the present aspect may represent personal, physical characteristics of the user that may be used to authenticate the user on the security system.

It is also conceivable for the features of the biometric data to be able to include at least one of the following features:
F1 Reference position of the fingers and/or hand of the user
F2 Relative position of the individual fingertips to one another and/or to the relevant reference position of the fingers
F3 Finger orientation
F4 Rotation of the fingers
F5 Fingerprint and/or palm print, etc.

A concept of the present aspect is that the authentication of the user on the security system is carried out during a plug-in procedure of the charging plug into a corresponding socket. The user beneficially does not notice any separate authentication step. For this purpose, a quick and secure method is provided which allows for intuitive and fluid operation of the charging station, which can be carried out quickly and in an imperceptible manner, and which allows greater convenience operating the charging station in some embodiments. In the process, the user does not need to carry with them any contactless and/or contact-based identification objects. Moreover, the danger of a security code being intercepted and/or copied may be substantially averted. Furthermore, the method in some embodiments merely requires a simple security system infrastructure.

Another concept of the present aspect is also that, for the authentication of the user, the features of the biometric data are evaluated in a plurality of stages. The multi-stage evaluation produces many significant benefits. Firstly, evaluation in a first stage can make it possible to broadly separate out incorrect authentication attempts. Secondly, evaluation in a second stage can make possible detailed evaluation of features of the biometric data. During the first stage and second stage, other (sub)steps may be provided which can enable the evaluation to be completed quickly. In addition, complex algorithms may be used in a second stage. Intelligent teaching of an evaluation logic of the control unit in the manner of a neural network is also conceivable in order to further improve the authentication of the user within the context of the present aspect and to make same even more accurate and thus reliable and also even faster and more convenient.

In some embodiments, a method for controlling a security system of a charging station for charging electric vehicles provides that the plurality of stages of the evaluation may include a first stage in which the features of the biometric data are compared with corresponding threshold values. This makes it possible to broadly separate out incorrect authentication attempts using little computing power and/or computing effort.

In some embodiments, the method for controlling a security system of a charging station for charging electric vehicles provides that the plurality of stages of the evaluation may include a second stage in which the temporal progression of the biometric data is analyzed by means of an evaluation logic in order to detect gripping patterns for the purpose of authenticating the user. This makes possible detailed analysis of biometric data, which can increase the accuracy and reliability of the method.

In some embodiments, the method for controlling a security system of a charging station for charging electric vehicles provides that in the first stage of the evaluation, each time the features of the biometric data are compared with corresponding threshold values, a corresponding comparison result may be output in percentages of between 0% and 100%. In this way, simple and representative comparison results can be provided in a quick and simple manner during evaluation of biometric data.

In some embodiments, the method for controlling a security system of a charging station for charging electric vehicles, provides that in the first stage of the evaluation, for each comparison of the characteristics of the biometric data with corresponding threshold values, a corresponding comparison result is calculated with a previously defined weighting factor. In this way, the features can be weighted. In other words, the importance of the features in the overall result can be determined. Therefore, it can be empirically established that, for example, the finger orientation and/or the fingerprint are important features or is an important feature by which most incorrect authentication attempts fail. This feature can then be assigned a higher weighting. This further improves the process of broadly separating out incorrect authentication attempts.

In some embodiments, the method for controlling a security system of a charging station for charging electric vehicles provides that the evaluation may be interrupted in the first stage and the authentication of the user may be considered to have failed if a weighted comparison result of at least one selected feature of the biometric data is less than a critical limit, e.g., 30%, or if at least one weighted comparison result of at least one feature of the features of the biometric data is less than a critical limit, e.g., 30%. In this way, obviously incorrect authentication attempts can be separated out more quickly.

In some embodiments, the method for controlling a security system of a charging station for charging electric vehicles provides that the comparison results offset against defined weighting factors may be added up to a total key indicator. In this way, a combined, representative comparison result can be provided in the first stage of the evaluation.

In some embodiments, the method for controlling a security system of a charging station for charging electric vehicles provides that the evaluation may be interrupted in the first stage and the authentication of the user may be considered to have failed if the total key indicator is less than a first limit, for example 50%, and/or the evaluation may be passed over to the second stage if the total key indicator is between a first limit, for example 50%, and a second limit, for example 80%, and/or the evaluation may be completed in the first stage and the authentication of the user considered successful if the total key indicator is greater than a second limit, for example 80%. In this way, the method can be continued in an improved, selective manner if required or desired. At the same time, easily recognizable positive and negative results of the authentication can be found as early as in the first stage of the method.

In some embodiments, the method for controlling a security system of a charging station for charging electric vehicles in the second stage of the evaluation provides that the features of the biometric data may be processed into, e.g., time-dependent, functional features, such as at specific discrete points in time or continuously. In this way, the method may be used to detect entire movement sequences, gestures and/or gripping patterns, which may significantly increase the reliability and security of the authentication. For this purpose, specific identities that may be characterized by a combination of special functional features can be created for authenticating the user. In other words, the functional features may constitute the characteristics of an identity.

In addition and in some embodiments, the functional features of the biometric data may include at least one of the following functional features:

FF1 Surface touched (quantity, locations)
FF2 Pressure exerted (quantity, locations)
FF3 Fingers detected (quantity, type)
FF4 Duration of particular phases of the procedure (e.g. between touching by the first finger and touching by the second finger), etc.

In this way, the accuracy and sensitivity of the evaluation can be increased significantly.

In some embodiments, the method for controlling a security system of a charging station for charging electric vehicles provides that in the second stage of the evaluation, the functional features may be compared with corresponding functional features of various identities. In this way, various identities that wish to operate the charging station can be recognized, and, e.g., selected identities authorized to operate the charging station can be recognized quickly and reliably.

In some embodiments, the method for controlling a security system of a charging station for charging electric vehicles provides that a particular distance may be taken into consideration during comparison of the functional features with corresponding functional features of various identities. In this way, the results can be refined during evaluation of the biometric data. In addition, a reduced quantity of representative results can thus be taken into consideration.

In some embodiments, the method for controlling a security system of a charging station for charging electric cars provides that the results of the evaluation may be taken into consideration in the first stage during comparison of the functional features with corresponding functional features of various identities. Therefore, a quicker positive result can be provided, for example, if a high total key indicator was calculated for the summated and weighted features of the biometric data in the first stage.

In some embodiments, the method for controlling a security system of a charging station for charging electric vehicles provides that each time the functional features match corresponding functional features of specific or recognized identities, a hit for the relevant identity may be added up. This makes it easy and intuitive to approach the correct identity.

In some embodiments, the method for controlling a security system of a charging station for charging electric vehicles provides that the relevant identity that receives the most hits may be considered recognized. This way, a reliable and plausible result can be provided during the evaluation.

In some embodiments, the method for controlling a security system of a charging station for charging electric vehicles provides that the relevant identity that receives a first, e.g., specific, number of hits, a so-called minimum quota, may be considered recognized. The method can therefore be sped up, a positive authentication being output immediately once same has been established without all possible identities and/or the functional features thereof having to be evaluated down to the last detail.

In some embodiments, the method for controlling a security system of a charging station for charging electric vehicles provides that if a specific or recognized identity receives a second, e.g., specific, number of hits, a so-called maximum quota, the functional features of said specific identity may be used to update and/or verify said specific identity and/or to teach the evaluation logic. This way, an improved method can be provided for the self-learning, intelligent evaluation logic within the control unit.

In some embodiments, the method for controlling a security system of a charging station for charging electric vehicles provides that the method can be used to create and/or teach new identities, e.g., if only one identity has been recognized.

Teaching of the evaluation logic can be initiated knowingly or manually, e.g., via a configuration menu on the charging station. However, it is also conceivable for the teaching of the evaluation logic to take place in an automated and/or continuous manner in that, for example, a mean value of extracted and evaluated features is updated as threshold values and/or a mean value of functional features derived from said features is consistently updated as reference values for the specific or recognized identity.

Furthermore, within the scope of the present aspect, it is also conceivable for at least one method step for extracting the features from the biometric data, implementing a first stage of the evaluation and/or implementing a second stage of the evaluation to be transferred to a back end. In this way, the computing power can be transferred in full or in part.

In addition and in a further exemplary aspect, a security system for a charging station for charging electric vehicles is provided, the security system comprising the following elements: a charging plug, the charging plug comprising a sensor unit for recording biometric data of a user that are used for authenticating the user on the security system, and a control unit for evaluating biometric data of the user. According to the present aspect, the control unit is designed to extract a plurality of features from the biometric data of the user and to evaluate the features of the biometric data in a plurality of stages. Using the security system according to the present aspect, the same benefits as those described above in relation to the method according to the first exemplary aspect are achieved. Reference is made to the preceding first exemplary aspect and the associated discussion. In some embodiments, the security system of this aspect may be operated according to one or more embodiments, discussed in the preceding with respect to the first exemplary aspect.

In some embodiments, the control unit may be specifically designed to carry out, in full or in part, the method as described in the preceding according to various embodiments.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 2:
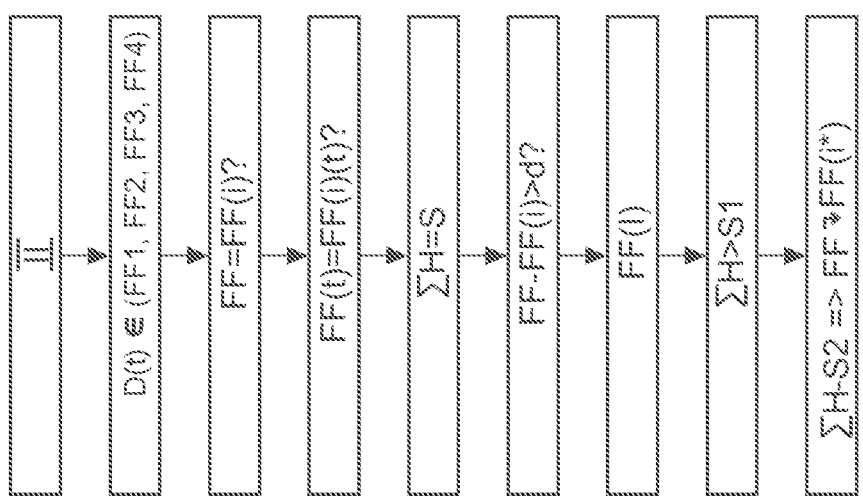
FIG. 2 shows a schematic representation of a method with evaluation examples in a second stage.

FIG. 1 shows a first stage I of a method for controlling a security system according to an embodiment. FIG. 2 shows a second stage II of the method. A schematic flow chart of a method including the first stage I and the second stage II is shown in FIG. 3.

Figure 5:
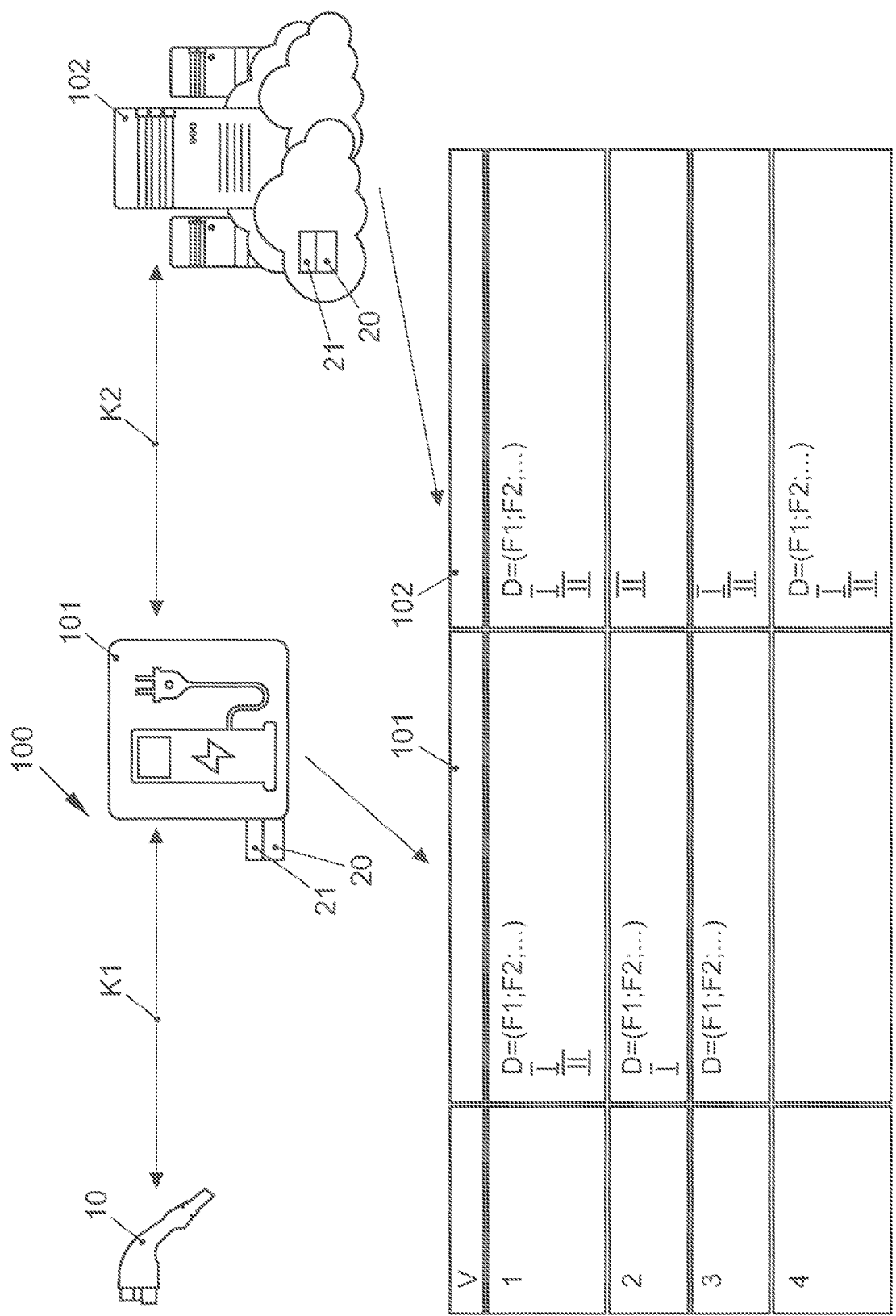
FIG. 5 shows an exemplary security system.

The method according to the teachings herein is used to control a security system 100 of a charging station 101 for charging electric vehicles, the security system 100 being depicted schematically in FIG. 5. As shown in FIG. 5, the security system 100 comprises the following elements: a charging plug 10 and a control unit 20.

Figure 4:
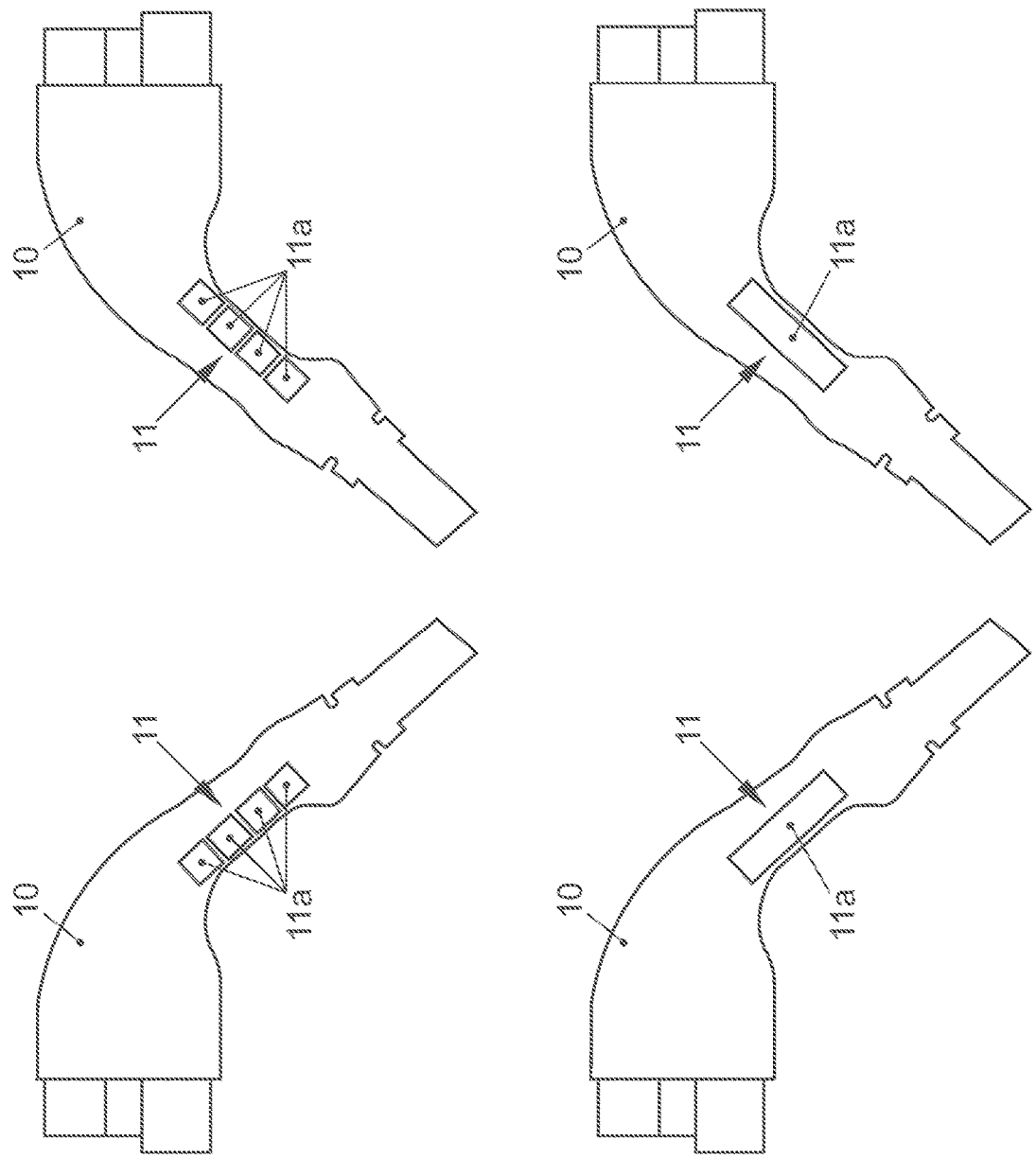
FIG. 4 shows an exemplary charging plug.

The charging plug 10 is also shown in FIG. 4, in which the charging plug 10 is shown to comprise a sensor unit 11 for recording biometric data D of a user. The biometric data D are used to authenticate the user on the security system 100. The sensor unit may comprise optical, capacitive and/or acoustic sensor elements 11*a*, e.g. in the form of fingerprint scanners, for recording biometric data D of a user. It is also conceivable for the sensor unit 11 to be able to comprise a plurality of isolated sensor elements 11*a* (see top views in FIG. 4) and/or extensive and/or strip-shaped sensor elements 11*a* (see bottom views in FIG. 4) for recording biometric data D of a user. Extensive and/or strip-shaped sensor elements 11*a* may be used to extract complex features F1, F2, F3, F4, F5 of the biometric data D and even to calculate personalized movement sequences, gestures and/or gripping patterns therefrom.

Figure 3:
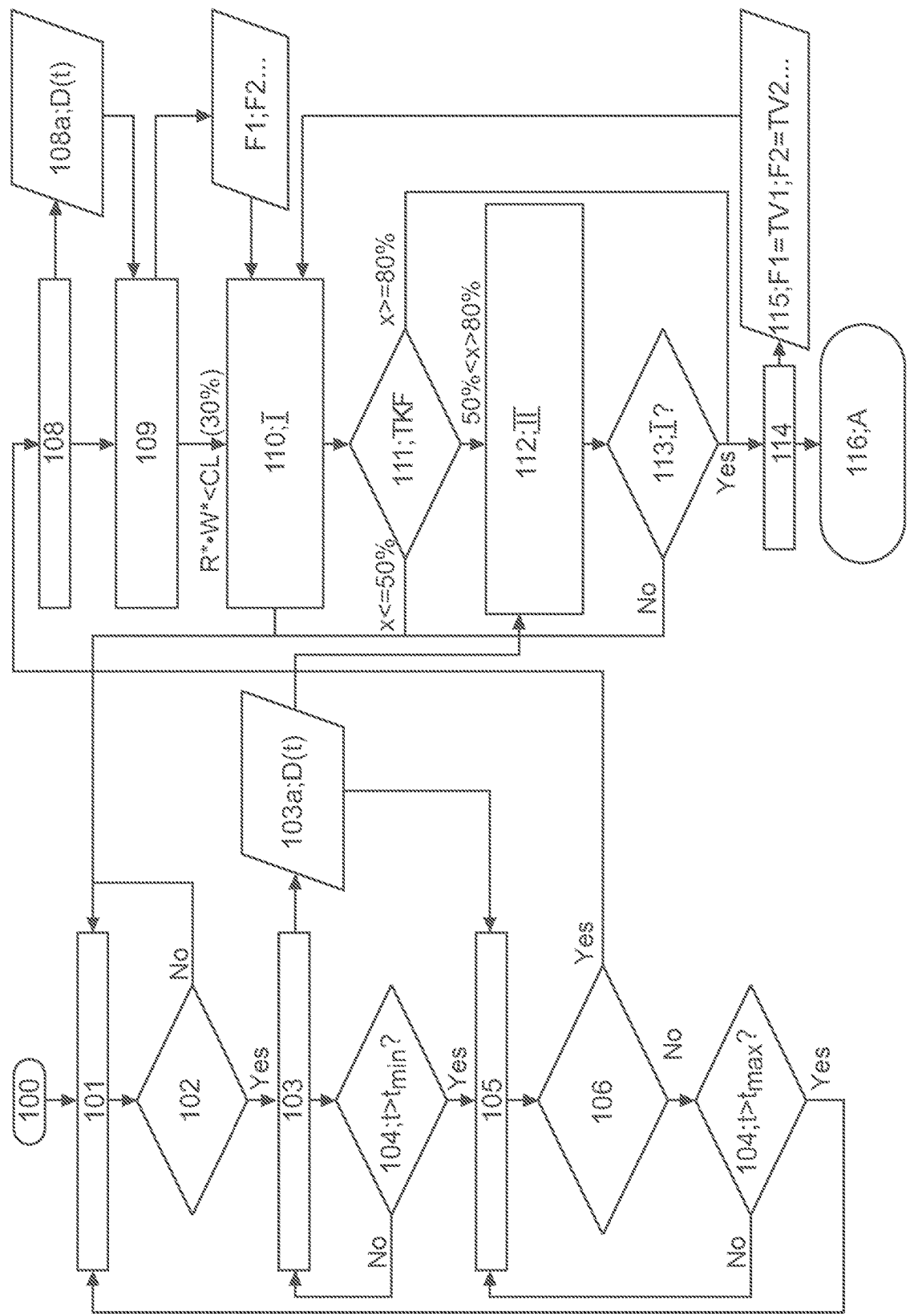
FIG. 3 shows a schematic flow chart of a method.

The control unit 20 extracts a plurality of features F1, F2, F3, F4, F5 from the biometric data D of the user, and the control unit 20 evaluates the features F1, F2, F3, F4, F5 of the biometric data D in a plurality of stages I, II, as shown in detail in FIGS. 1 to 3.

"Extract" in this case means that the control unit 20 detects specific characteristic features F1, F2, F3, F4, F5 of a user that can allow for fast, secure and reliable authentication of the user from the plethora of recorded biometric data D with the aid of the sensor unit 11. In other words, the features F1, F2, F3, F4, F5 of the biometric data D may represent personal, in particular physical, characteristics of the user that can be used to authenticate the user on the security system 100.

Examples of such features F1, F2, F3, F4, F5 of the biometric data D may be the following features F1, F2, F3, F4, F5:
F1 Reference position of the fingers and/or hand of the user
F2 Relative position of the individual fingertips to one another and/or to the relevant reference position of the fingers
F3 Finger orientation
F4 Rotation of the fingers
F5 Fingerprint and/or palm print, etc.

The quantity of five possible features F1, F2, F3, F4, F5 is merely an example. Of course, there may be more or less features that are extracted from the recorded biometric data D and evaluated by the control unit 20.

Beneficially, the staged authentication of the user takes place during a plug-in procedure of the charging plug 10 into a corresponding socket on the electric vehicle. In the process, the user perceives no separate authentication step, which allows for intuitive and fluid operation of the charging station 101, which goes hand in hand with increased user comfort. Furthermore, it is beneficial that the user does not have to carry with them any contactless and/or contact-based identification objects, such as ID transmitters, e.g. in the form of RFID chips. Moreover, the risk of a security code being intercepted and/or copied by unauthorized person is reduced.

As shown in FIG. 1, the first stage I of the evaluation comprises a comparison of the features F1, F2, F3, F4, F5 of the biometric data D with corresponding threshold values TV1, TV2, TV3, TV4, TV5 in order to make it possible to broadly separate out incorrect authentication attempts using little computing power and/or computing effort.

Also shown in FIG. 1, in the first stage I of the evaluation, each time the features F1, F2, F3, F4, F5 of the biometric data D are compared with corresponding threshold values TV1, TV2, TV3, TV4, TV5, a corresponding comparison result R1, R2, R3, R4, R5 is output in percentages of between 0% and 100%.

Also shown in FIG. 1, in the first stage I of the evaluation, each time the features F1, F2, F3, F4, F5 of the biometric data D are compared with corresponding threshold values TV1, TV2, TV3, TV4, TV5, a corresponding comparison result R1, R2, R3, R4, R5 is in each case offset against a previously defined weighting factor W1, W2, W3, W4, W5 in order to weight the features F1, F2, F3, F4, F5 for the purpose of prioritizing same. If, for example, it has been identified from previous method runs that, for example, the finger orientation F3 or the fingerprint F1 is an important feature by which most incorrect authentication attempts fail, this feature may be assigned a higher weighting in order to speed up the process of broadly separating out incorrect authentication attempts. Computational examples E1 to E4 for this are shown in the table on the right-hand side in FIG. 1.

Moreover, FIG. 1 shows that the evaluation is interrupted in the first stage I and the authentication of the user is considered to have failed if a weighted comparison result R*W* of at least one selected feature F* of the biometric data D is less than a critical limit CL, e.g. 30%. A computational example E1 for this is shown in the table on the right-hand side in FIG. 1.

Moreover, FIG. 1 shows that the comparison results R1, R2, R3, R4, R5 offset against defined weighting factors W1, W2, W3, W4, W5 are added up to a total key indicator TKF in order to provide a combined, representative comparison result R in the first stage I of the evaluation.

Furthermore, FIG. 1 shows:
that the evaluation is interrupted in the first stage I and the authentication of the user is considered to have failed if the total key indicator TKF is less than a first limit of e.g. 50% (cf. computational example E4 in the table in FIG. 1),
and/or that the evaluation is passed over to the second stage I if the total key indicator TKF is between a first limit L1 of e.g. 50% and a second limit L2 of e.g. 80% (cf. computational example E3 in the table in FIG. 1),
and/or that the evaluation is completed in the first stage I and the authentication of the user is considered successful if the total key indicator TKF is greater than a second limit L2 of e.g. 80% (cf. computational example E2 in the table in FIG. 1).

This way, the method can be executed more efficiently.
As shown in FIG. 2, the second stage II of the evaluation comprises an analysis of the temporal progression D(t) of the biometric data D by means of an evaluation logic 21 in order to allow for detailed analysis of biometric data D and, e.g., in order to detect gripping patterns for the purpose of authenticating the user.

FIG. 2 also shows that, in the second stage II of the evaluation, the features F1, F2, F3, F4, F5 of the biometric data D are processed into, may be time-dependent, functional features FF1, FF2, FF3, FF4, FF5, in particular at specific discrete points in time or continuously, in order to detect entire movement sequences, gestures and/or gripping patterns, which can increase the reliability and security of the authentication.

For this purpose, specific identities i that may be characterized by a combination of special functional features FF1, FF2, FF3, FF4, FF5 can be created for authenticating the user.

The following functional features FF1, FF2, FF3, FF4, FF5 serve as examples of functional features FF1, FF2, FF3, FF4, FF5 of the biometric data D:

FF1 Surface touched (quantity, locations)
FF2 Pressure exerted (quantity, locations)
FF3 Fingers detected (quantity, type)
FF4 Duration of particular phases of the procedure (e.g. between touching by the first finger and touching by the second finger), etc.

In this case, too, the quantity of four possible functional features FF1, FF2, FF3, FF4, FF5 is merely an example. Of course, there may be more or fewer features that are extracted from the recorded biometric data D and evaluated by the control unit 20.

FIG. 2 schematically shows that, in the second stage II of the evaluation, the functional features FF1, FF2, FF3, FF4, FF5 are compared with corresponding functional features $FF1(i)$, $FF2(i)$, $FF3(i)$, $FF4(i)$, $FF5(i)$ of various identities i. This can also be done in a time-resolved manner.

Furthermore, FIG. 2 shows that a particular distance d that must not be exceeded is taken into consideration during comparison of the functional features FF1, FF2, FF3, FF4, FF5 with corresponding functional features $FF1(i)$, $FF2(i)$, $FF3(i)$, $FF4(i)$, $FF5(i)$ of various identities i in order to streamline the method ($FF-FF(i)<d$).

Moreover, FIG. 2 shows that the results FF(I) of the evaluation are taken into consideration in the first stage I during comparison of the functional features FF1, FF2, FF3, FF4, FF5 with corresponding functional features $FF1(i)$, $FF2(i)$, $FF3(i)$, $FF4(i)$, $FF5(i)$ of various identities i in order to streamline the method further.

FIG. 2 also shows, schematically in the flow chart on the left and in the table on the right, that each time the functional features FF1, FF2, FF3, FF4, FF5 match corresponding functional features $FF1(i)$, $FF2(i)$, $FF3(i)$, $FF4(i)$, $FF5(i)$ of specific or recognized identities i*, a hit H for the relevant identity i* is added up to a sum S.

In addition, FIG. 2 shows in the table on the right that the relevant identity i that receives the most hits H is considered recognized. In the example in the table in FIG. 2, it is, for example, identity i4.

Moreover, FIG. 2 schematically shows in the flow chart on the left that, according to the method, the relevant identity i* that receives a first, in particular specific, number S1 of hits H, a so-called minimum quota, may be considered recognized. This way, the method can be completed more quickly.

Furthermore, FIG. 2 shows schematically in the flow chart on the left that, if a specific or recognized identity receives a second, in particular specific, number S2 of hits H, a so-called maximum quota, the functional features FF1, FF2, FF3, FF4, FF5 of said specific identity i* may be used to update and/or verify said specific identity i* and/or to teach the evaluation logic 21. This way, by means of the method, a self-learning, adaptive or, to put it simply, intelligent evaluation logic 21 can be provided within the control unit 20.

Furthermore, within the scope of the present teaching, it is also conceivable that the method being used for creating and/or teaching new identities i. In this regard, during execution of the method, databases can be created for the features F1, F2, F3, F4, F5 of the first stage I, the functional features FF1, FF2, FF3, FF4, FF5, and the resulting identities i.

Moreover, it is also conceivable for teaching of the evaluation logic 21 to be initiated consciously or manually, e.g. via a configuration menu on the charging station 101, and/or for teaching of the evaluation logic 21 to take place in an automated and/or continuous manner in that, for example by a mean value of extracted and evaluated features F1, F2, F3, F4, F5 as threshold values TV1, TV2, TV3, TV4, TV5 and/or functional features FF1, FF2, FF3, FF4, FF5 derived from said features F1, F2, F3, F4, F5 is consistently updated as reference values for the specific or recognized identity i*.

As subsequently shown in FIG. 5, at least one method step for extracting the features F1, F2, F3, F4, F5 from the biometric data D, implementing a first stage I of the evaluation and/or implementing a second stage II of the evaluation can be transferred to a back end 102 in order to transfer the computing power in full or in part from the security system 100 on the charging station 101 to the back end 102.

The security system 100 according to FIG. 5 may in particular be characterized in that the control unit 20 is specifically designed to carry out, in full or in part, a method that may proceed as described above.

The description of the FIGS. given in the preceding describes the present invention by way of examples. Individual features of the embodiments may be combined freely with one another, to the extent that this is technically feasible, without departing from the scope of the invention.

LIST OF REFERENCE NUMBERS

10 Charging plug
11 Sensor unit
11a Sensor element
20 Control unit
21 Evaluation logic
100 Security system
101 Charging station
102 Back end
I First stage
II Second stage
D Biometric data
F Feature
F1 Feature
F2 Feature
F3 Feature
F4 Feature
F5 Feature
F* Selected feature
R Comparison result
R1 Comparison result
R2 Comparison result
R3 Comparison result
R4 Comparison result
R5 Comparison result
RW Weighted comparison result of at least one feature
R*W* Weighted comparison result of a selected feature
CL Critical limit
TKF Total key FIG.
L1 First limit
L2 Second limit
TV1 Threshold value
TV2 Threshold value
TV3 Threshold value TV4 Threshold value
TV5 Threshold value
W1 Weighting factor
W2 Weighting factor
W3 Weighting factor
W4 Weighting factor
W5 Weighting factor
FF Functional feature
FF1 Functional feature
FF2 Functional feature
FF3 Functional feature
FF4 Functional feature
FF1 (i) Functional feature of various identities
FF2 (i) Functional feature of various identities
FF3(i) Functional feature of various identities
FF4(i) Functional feature of various identities
i Identity
i* Specific identity
t Time
H Hit
S Sum
S1 First number of hits
S2 Second number of hits The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for controlling a security system of an electric vehicle charging station for charging electric vehicles, the security system comprising a charging plug, wherein the charging plug comprising a sensor for recording biometric data of a user that are used for authenticating the user on the security system and a control unit for evaluating biometric data of the user; the method comprising, by the control unit:
    extracting, a plurality of features from the biometric data of the user;
    conducting a first stage, comprising first stage analyzing of at least some of the plurality of features to authenticate the user and to broadly separate out incorrect authentication attempts;
    based on a successful authentication in the first stage evaluation, selectively conducting a second stage to authenticate the user, comprising a second stage analyzing of at least some of the plurality of features, which second stage analyzing is more detailed compared to the first stage analyzing; and
    selectively authenticating the user for use of the electric vehicle charging stating based on the successful authentication of the user in the first stage and a successful authentication of the user in the second stage.

2. The method of claim 1, comprising in the first stage, comparing features of the biometric data with corresponding threshold values.

3. The method of claim 1, comprising in the second stage, analyzing a temporal progression of the biometric data using an evaluation logic in order to detect gripping patterns for the purpose of authenticating the user.

4. The method of claim 2, wherein during comparing, outputting a corresponding comparison result in percentages of between 0% and 100%.

5. The method of claim 2, wherein during comparing, offsetting a corresponding comparison result using a pre-defined weighting factor.

6. The method of claim 2, wherein a processing is interrupted before the second stage and an authentication of the user is considered to have failed if a weighted comparison result of at least one selected feature of the biometric data is less than a critical limit or if at least one weighted comparison result of at least one feature of the features of the biometric data is less than a critical limit.

7. The method of claim 5, comprising adding up comparison results offset against defined weighting factors to a total key indicator.

8. The method of claim 7, wherein a processing is interrupted before the second stage and an authentication of the user is considered to have failed if the total key indicator is less than a first limit; and/or
    the processing in continued in the second stage if the total key indicator is between a first limit and a second limit; and/or
    the processing is completed in the first stage and the authentication of the user is considered successful if the total key indicator is greater than a second limit.

9. The method of claim 3, comprising in the second stage, processing the features of the biometric data are processed into functional features.

10. The method of claim 9, comprising in the second stage, comparing the functional features with corresponding functional features of various identities.

11. The method of claim 2, comprising in the second stage, analyzing a temporal progression of the biometric data using an evaluation logic in order to detect gripping patterns for the purpose of authenticating the user.

12. The method of claim 3, wherein during comparing, outputting a corresponding comparison result in percentages of between 0% and 100%.

13. The method of claim 3, wherein during comparing, offsetting a corresponding comparison result using a pre-defined weighting factor.

14. The method of claim 4, wherein during comparing, offsetting a corresponding comparison result using a pre-defined weighting factor.

15. The method of claim 3, wherein a processing is interrupted before the second stage and an authentication of the user is considered to have failed if a weighted comparison result of at least one selected feature of the biometric data is less than a critical limit or if at least one weighted comparison result of at least one feature of the features of the biometric data is less than a critical limit.

16. The method of claim 4, wherein a processing is interrupted before the second stage and an authentication of the user is considered to have failed if a weighted comparison result of at least one selected feature of the biometric data is less than a critical limit or if at least one weighted comparison result of at least one feature of the features of the biometric data is less than a critical limit.

17. The method of claim 5, wherein a processing is interrupted before the second stage and an authentication of the user is considered to have failed if a weighted comparison result of at least one selected feature of the biometric data is less than a critical limit or if at least one weighted comparison result of at least one feature of the features of the biometric data is less than a critical limit.

18. A security system for an electric vehicle charging station for charging electric vehicles, wherein the security system comprises:
   a charging plug, wherein the charging plug comprising a sensor for recording biometric data of a user; and
   a control unit, connected with the sensor for evaluating the biometric data of the user;
wherein the control unit is configured to:
   extract a plurality of features from the biometric data of the user;
   conduct a first stage, comprising first stage analyzing of at least some of the plurality of features to authenticate the user and to broadly separate out incorrect authentication attempts;
   based on a successful authentication in the first stage, selectively conduct a second stage to authenticate the user, comprising a second stage analyzing of at least some of the plurality of features, which second stage analyzing is more detailed compared to the first stage analyzing; and
   selectively authenticate the user for use of the electric vehicle charging stating based on the successful authentication of the user in the first stage and a successful authentication of the user in the second stage.

19. An electric vehicle charging station for charging electric vehicles having the security system of claim 18.

20. A non-transitory medium including contents that are configured to cause a security system for an electric vehicle charging station to conduct the method of claim 1.

* * * * *